United States Patent
Tsai et al.

(10) Patent No.: US 9,674,758 B2
(45) Date of Patent: Jun. 6, 2017

(54) MULTI-SIM USER EQUIPMENT AND WIRELESS COMMUNICATION METHOD THEREOF

(71) Applicant: MediaTek Inc., Hsin-Chu (TW)

(72) Inventors: Chih-Yuan Tsai, New Taipei (TW); Chi-Chen Lee, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/943,387

(22) Filed: Nov. 17, 2015

(65) Prior Publication Data

US 2016/0142998 A1 May 19, 2016

Related U.S. Application Data

(60) Provisional application No. 62/194,368, filed on Jul. 20, 2015, provisional application No. 62/081,692, filed on Nov. 19, 2014.

(51) Int. Cl.
| | |
|---|---|
| *H04W 36/30* | (2009.01) |
| *H04W 36/00* | (2009.01) |
| *H04B 1/3816* | (2015.01) |
| *H04W 68/02* | (2009.01) |
| *H04W 88/02* | (2009.01) |
| *H04W 48/20* | (2009.01) |
| *H04W 88/06* | (2009.01) |

(52) U.S. Cl.
CPC .......... *H04W 36/30* (2013.01); *H04B 1/3816* (2013.01); *H04W 36/0083* (2013.01); *H04W 68/02* (2013.01); *H04W 36/0061* (2013.01); *H04W 48/20* (2013.01); *H04W 88/02* (2013.01); *H04W 88/06* (2013.01)

(58) Field of Classification Search
CPC ....................................................... H04W 36/30
See application file for complete search history.

(56) References Cited

U.S. PATENT DOCUMENTS

| | | | | |
|---|---|---|---|---|
| 2013/0148574 A1* | 6/2013 | Liu | ........................ | H04W 36/08 370/328 |
| 2014/0364118 A1* | 12/2014 | Belghoul | .............. | H04W 4/003 455/435.1 |
| 2016/0112084 A1* | 4/2016 | Parron | ................. | H04B 1/3816 455/558 |

* cited by examiner

*Primary Examiner* — Michael T Vu
(74) *Attorney, Agent, or Firm* — McClure, Qualey & Rodack, LLP

(57) ABSTRACT

A wireless communication method and Multi-SIM user equipment are provided. The wireless communication method for Multi-SIM dual standby (DSDS) technology is applied on Multi-SIM user equipment (UE) which is capable of carrier aggregation (CA) or dual connectivity (DuCo). The wireless communication method includes the steps of determining whether a packet switch (PS) or circuit switch (CS) paging is received on a second SIM card when a first PS call is ongoing in a first SIM card; and suspending the first PS call which is ongoing on the first SIM card if the packet switch (PS) or circuit switch (CS) paging is received on the second SIM card.

10 Claims, 13 Drawing Sheets

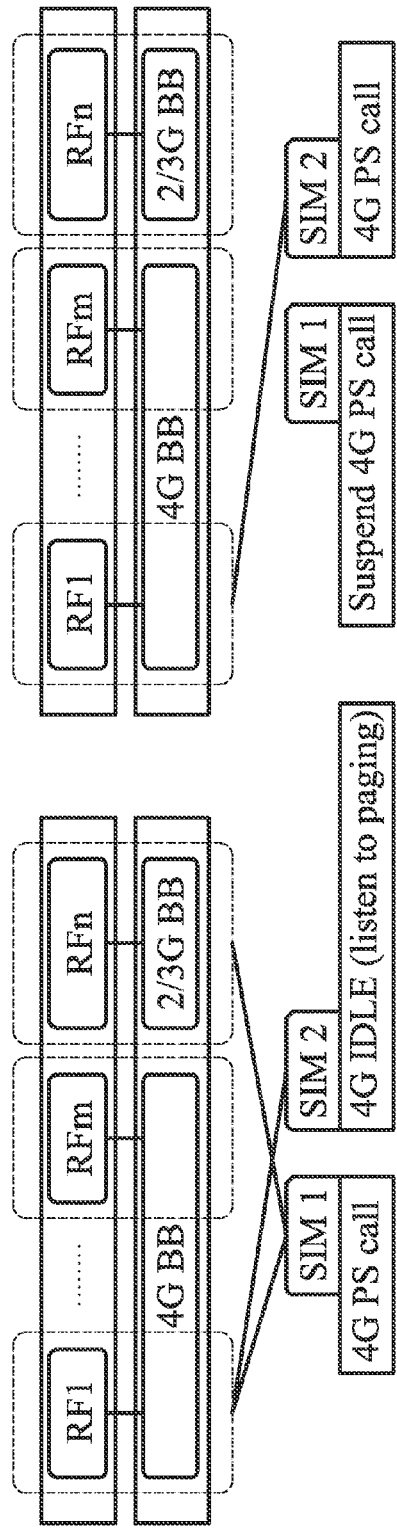
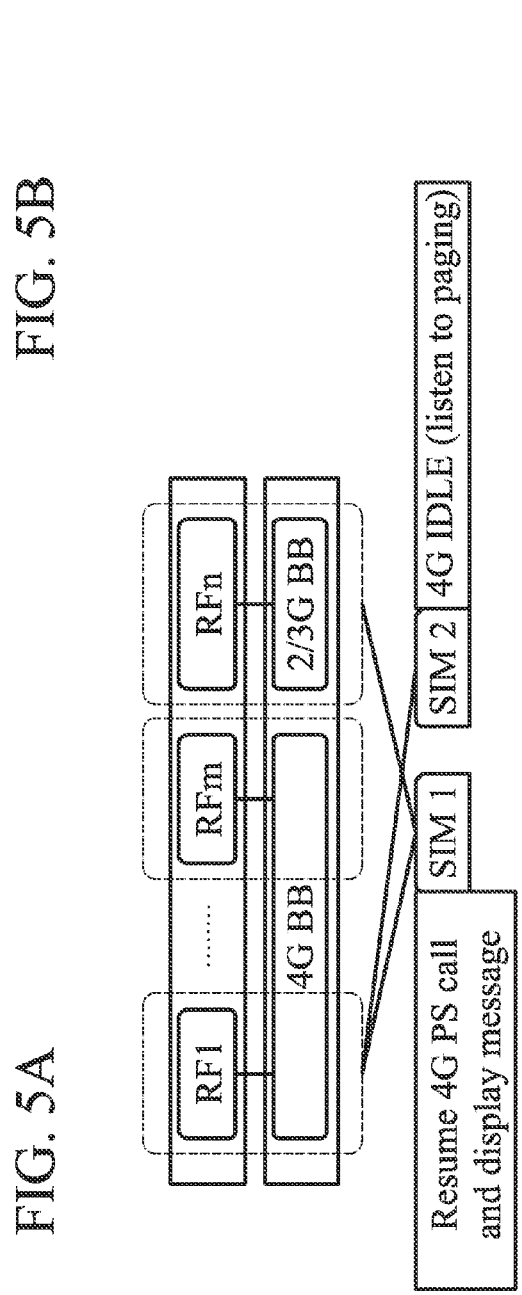
FIG. 5A
FIG. 5B
FIG. 5C

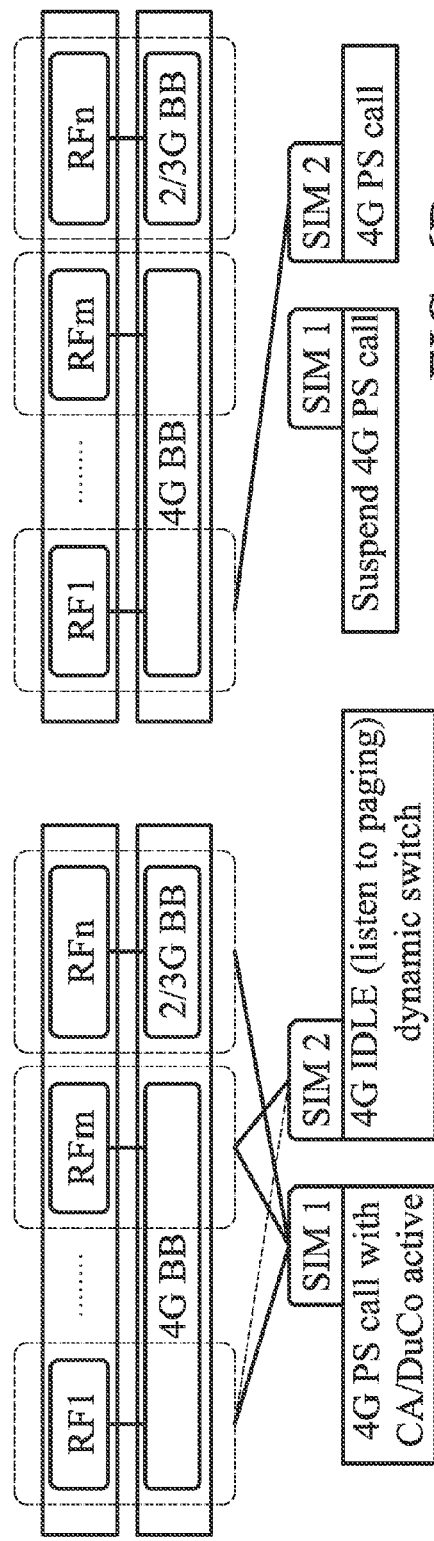
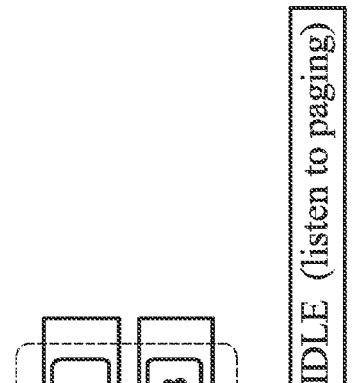
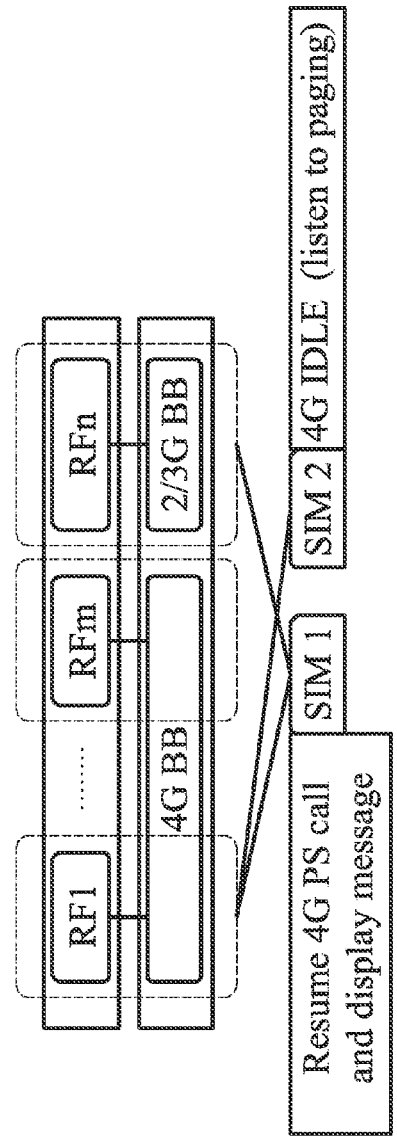
FIG. 6A
FIG. 6B
FIG. 6C

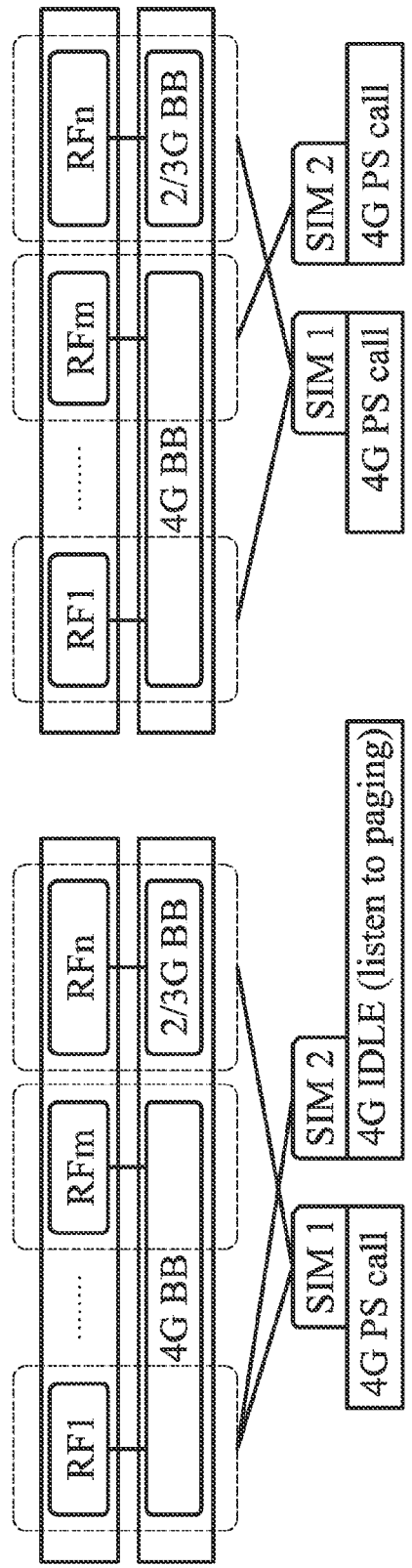

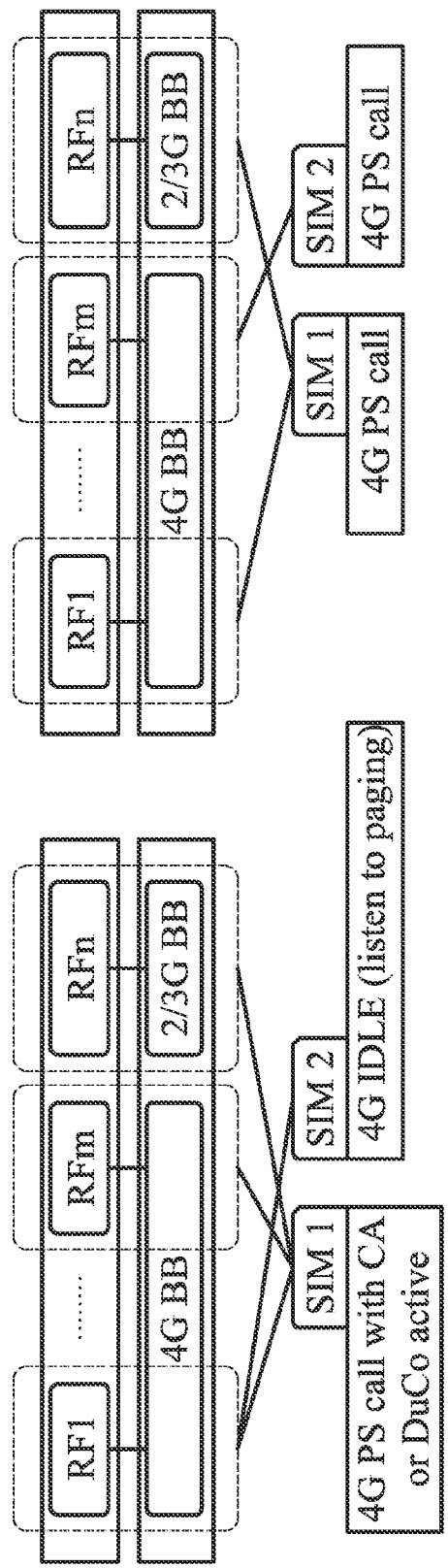

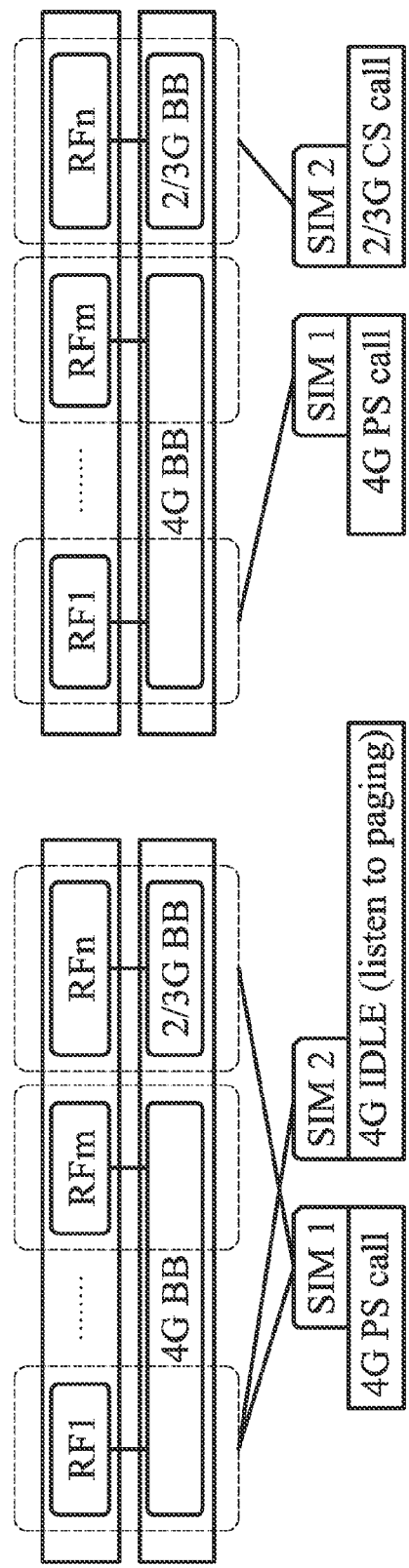

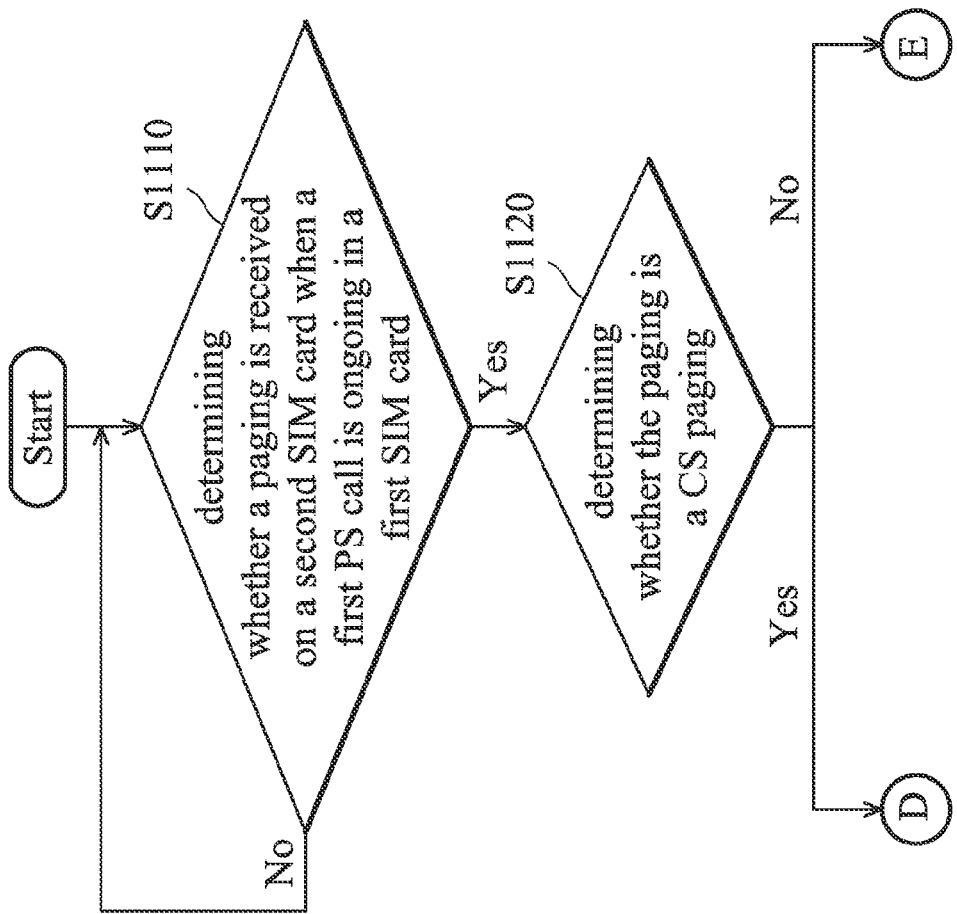
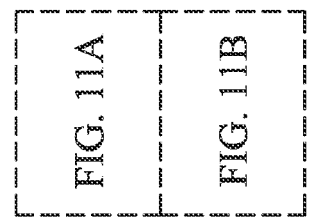
FIG. 11A

MULTI-SIM USER EQUIPMENT AND WIRELESS COMMUNICATION METHOD THEREOF

CROSS REFERENCE TO RELATED APPLICATIONS

This application claims priority of U.S. Provisional Patent Application No. 62/081,692, filed on Nov. 19, 2014 and Provisional Patent Application No. 62/194,368, filed on Jul. 20, 2015, the entirety of which is incorporated by reference herein.

BACKGROUND OF THE INVENTION

Field of the Invention

The invention generally relates to a Multi-SIM user equipment technology, and more particularly, to the Multi-SIM calls with carrier aggregation (CA) and/or dual connectivity (DuCo).

Description of the Related Art

Wireless communication systems have been widely deployed to provide various telecommunication services such as telephony, video, data, messaging, and broadcast. Typical wireless communication systems may employ multiple-access technologies capable of supporting communication with multiple users by sharing available system resources (e.g., bandwidth, transmission power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Teletransmissions System (UMTS) mobile standard promulgated by the Third Generation Partnership Project (3GPP). It is designed to better support mobile broadband Internet access by improving spectral efficiency, lowering costs, improving services, making use of new spectrums, and integrating better with other open standards using OFDMA on downlinks (DL), and SC-FDMA on uplinks (UL) and multiple-input multiple-output (MIMO) antenna technology.

A Multi-SIM wireless communication device may be one which holds two SIM cards, which means that the device can handle two different network services. Each network service can be assigned to a different account or telephone number. In wireless devices that include only one transceiver, only one of the two subscriptions may be transmitting or receiving radio frequency (RF) signals at a time. Such devices are referred to as Dual SIM Dual Standby (DSDS) devices, since while one service is actively transmitting or receiving the other service is put on standby. In contrast, in wireless devices that include two transceivers and two SIM cards, referred to as Dual SIM Dual Active (DSDA) devices, both services may be actively transmitting or receiving at the same time.

In a traditional DSDS device, if a PS call is ongoing over the first SIM card, the DSDS device may not monitor or ignore incoming MT (Mobile Terminated) PS call or MT CS call notification (i.e. paging message) received on the second SIM card. Therefore, how to adopt a flexible mechanism for the user to obtain the call information (e.g. caller number) corresponding to the MT PS call or MT CS call received on the second SIM card, or decide whether to pick up the MT PS call or MT CS call from the second SIM card, is a subject worthy of discussion. In addition, in a traditional DSDA device, the DSDA device needs to duplicate additional hardware for another SIM card before activating the dual voice call. This may result in additional costs for the duplicated hardware.

BRIEF SUMMARY OF THE INVENTION

Multi-SIM user equipment and wireless communication method are provided to overcome the problems mentioned above.

An embodiment of the invention provides a wireless communication method for dual SIM dual standby (DSDS) technology. The wireless communication method is applied on Multi-SIM user equipment (UE) which is capable of carrier aggregation (CA) or dual connectivity (DuCo). The wireless communication method comprises the steps of determining whether packet switch (PS) or circuit switch (CS) paging is received on a second SIM card when a first PS call is ongoing in a first SIM card; and suspending the first PS call which is ongoing on the first SIM card if the packet switch (PS) or circuit switch (CS) paging is received on the second SIM card. In the embodiment of the invention, the wireless communication method further comprises the steps of initiating a protection timer when the first PS call is suspended and resuming the first PS call when the protection timer expires.

An embodiment of the invention provides a wireless communication method for dual SIM dual active (DSDA) technology. The wireless communication method is applied on Multi-SIM user equipment (UE) which is capable of carrier aggregation (CA) or dual connectivity (DuCo). The wireless communication method comprises the steps of determining whether a paging is received on a second SIM card when a first PS call is ongoing in a first SIM card; and dedicating a communication hardware to the second SIM card, if the paging is received on the second SIM card, wherein the communication hardware is a 2G/3G hardware or a 4G hardware.

An embodiment of the invention provides Multi-SIM user equipment (UE) for dual SIM dual standby (DSDS) technology. The Multi-SIM user equipment (UE) is capable of carrier aggregation (CA) or dual connectivity (DuCo). The Multi-SIM user equipment comprises a processor. The processor is configured to determine whether a packet switch (PS) or circuit switch (CS) paging is received on a second SIM card when a first PS call is ongoing in a first SIM card, and suspend the first PS call which is ongoing on the first SIM card if the packet switch (PS) or circuit switch (CS) paging is received on the second SIM card. In the embodiment of the invention, the processor further initiates a protection timer when the first PS call is suspended and resumes the first PS call when the protection timer expires.

An embodiment of the invention provides Multi-SIM user equipment (UE) for dual SIM dual active (DSDA) technology. The Multi-SIM user equipment (UE) is capable of carrier aggregation (CA) or dual connectivity (DuCo). The Multi-SIM user equipment comprises a processor. The processor is configured to determine whether a paging is received on a second SIM card when a first PS call is ongoing in a first SIM card and dedicates a communication hardware to the second SIM card, if the paging is received on the second SIM card, wherein the communication hardware is a 2G/3G hardware or a 4G hardware.

Other aspects and features of the invention will become apparent to those with ordinary skill in the art upon review of the following descriptions of specific embodiments of methods and systems.

BRIEF DESCRIPTION OF THE DRAWINGS

The invention will become more fully understood by referring to the following detailed description with reference to the accompanying drawings, wherein:

FIGS. 5A-5C are schematic diagrams illustrating the 4G hardware configuration for non-activated CA or DuCo for DSDS technology according to an embodiment of the invention;

FIGS. 6A-6C are schematic diagrams illustrating the 4G hardware configuration for activated CA or DuCo for DSDS technology according to an embodiment of the invention.

FIGS. 7A-7B are schematic diagrams illustrating the 4G hardware configuration for non-activated CA or DuCo for DSDA technology according to an embodiment of the invention.

FIGS. 8A-8B are schematic diagrams illustrating the 4G hardware configuration for activated CA or DuCo for DSDA technology according to an embodiment of the invention.

FIGS. 9A-9B are schematic diagrams illustrating the 3G hardware configuration for DSDA technology according to an embodiment of the invention.

FIGS. 11A-11B is a flow chart illustrating the wireless communication method for dual SIM dual active (DSDA) technology according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
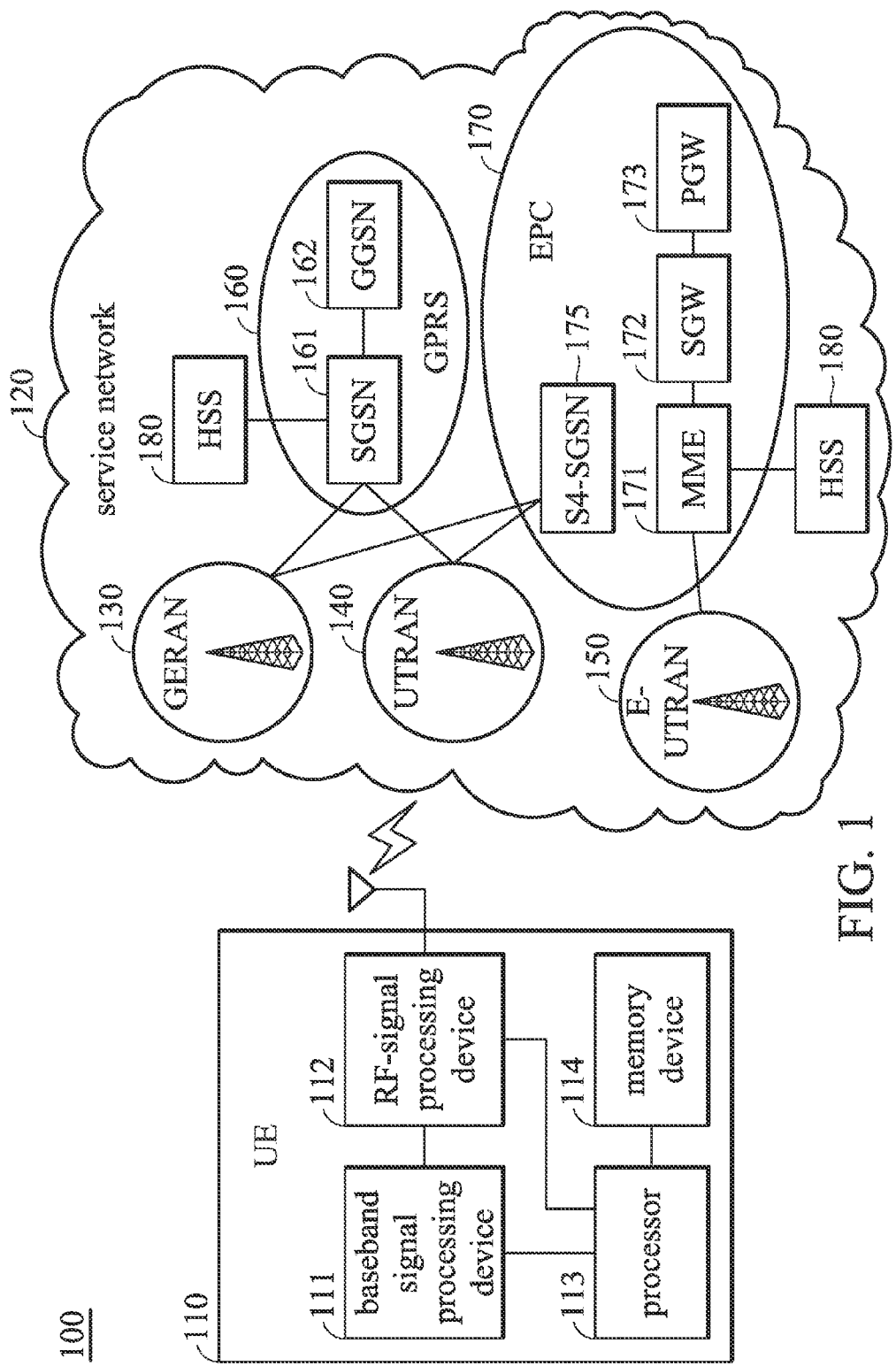
FIG. 1 is a block diagram of a mobile communications system 100 according to an embodiment of the invention.

FIG. 1 is a block diagram of a mobile communications system 100 according to an embodiment of the invention. The system 100 comprises User Equipment (UE) 110 and a service network 120. The UE 110 may be a mobile communications device, such as a cellular phone, a smartphone modem processor, a data card, a laptop stick, a mobile hotspot, a USB modem, a tablet, etc. In an embodiment of the invention, the UE 110 is Multi-SIM user equipment (UE) which is capable of carrier aggregation (CA) or dual connectivity (DuCo). Note that in order to clarify the concept of the invention, the invention only utilizes Dual-SIM user equipment (comprise two SIM cards) for description. However, the invention should not be limited thereto.

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, etc. In an embodiment of the invention, the RF signal processing device 112 may comprise a plurality of RF resources. In an embodiment of the invention, each of the RF resources can be dynamically assigned to a dedicated SIM card. In an embodiment of the invention, the RF resources can be shared with more SIM cards.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on. In an embodiment of the invention, the baseband signal processing device 111 comprises a 4G base band circuit and a 3G base band circuit. In an embodiment of the invention, the 4G base band circuit and the 3G base band circuit can be dynamically assigned to a dedicated SIM card. In an embodiment of the invention, the 4G base band circuit and the 3G base band circuit can be shared with more SIM cards. Note that, in the invention, for convenience of explanation, the 4G base band circuit and one of the RF resources may collectively be regarded as a 4G hardware, and the 3G base band circuit and one of the RF resources may collectively be regarded as a 3G hardware. In an embodiment of the invention, the UE 110 comprises two 4G hardware and one 3G hardware. Note that, in the embodiments of the invention, the UE 110 only needs one 4G base band circuit. Namely, the UE 110 does not need to duplicate additional 4G base band circuits when dual SIM dual active (DSDA) technology is adopted on the UE 110.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s).

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 1.

In addition, in some embodiments of the invention, the processor 113 may be configured inside of the baseband signal processing device 111, or the UE 110 may comprise another processor configured inside of the baseband signal processing device 111. Thus the invention should not be limited to the architecture as shown in FIG. 1.

The service network 120 may comprise a GSM EDGE Radio Access Network (GERAN) 130, a Universal Terrestrial Radio Access Network (UTRAN) 140, an Evolved UTRAN (E-UTRAN) 150, a General Packet Radio Service (GPRS) subsystem 160 and an Evolved Packet Core (EPC) subsystem 170. The GERAN 130, UTRAN 140 and E-UTRAN 150 may be in communication with the GPRS subsystem 160 or the EPC subsystem 170, wherein the GERAN 130, UTRAN 140 and E-UTRAN 150 allow connectivity between the UE 110 and the GPRS subsystem 160 or the EPC subsystem 170 by providing the functionality of wireless transmission and reception to and from the UE 110 for the GPRS subsystem 160 or the EPC subsystem 170, and the GPRS subsystem 160 or the EPC subsystem 170 signals the required operation to the GERAN 130, UTRAN 140 and E-UTRAN 150 for providing wireless services to the UE 110. The GERAN 130, UTRAN 140 and E-UTRAN 150 may contain one or more base stations (or called NodeBs or eNodeBs) and Radio Network Controllers (RNCs). Specifically, the GPRS subsystem 160 includes a Serving GPRS (General Packet Radio Services) Support Node (SGSN) 161 and a Gateway GPRS Support Node (GGSN) 162, wherein the SGSN 161 is the key control node for packet routing and transfer, mobility management (e.g., attach/detach and location management), session management, logical link management, and authentication and charging functions, etc., and the GGSN 162 is responsible for Packet Data Protocol (PDP) address assignments and inter-working with external networks. The EPC subsystem 170 may comprise a Mobility Management Entity (MME) 171, which may be responsible for idle mode UE tracking, paging procedures, and attachment and activation processes. The EPC subsystem 170 may also comprise a Servicing Gateway (SGW) 172, which may be responsible for the routing and forwarding of data packets. The EPC subsystem 170 may also include a Packet data network Gateway (PGW) 173, which may be responsible for providing connectivity from the UE 110 to external networks. Both the SGSN 161 and the MME 171 may be in communication with Home Subscriber Server (HSS) 180 which may provide device identification information, an International Mobile Subscriber Identity (IMSI), etc. It should be appreciated that the EPC subsystem 170 may also comprise a S4-SGSN 175, thereby allowing the GERAN 130 or UTRAN 140 to be accessed when the GPRS subsystem 160 is replaced by the EPC subsystem 170. Additionally, the service network 120 may further include other functional entities, such as a Home Location Register (HLR) (not shown) which is a central database storing user-related and subscription-related information, and the invention is not limited thereto. In an embodiment of the invention, the service network 120 may further comprise a Code Division Multiple Access (CDMA) network.

In an embodiment of the invention, for dual SIM dual standby (DSDS) technology, when a PS call (e.g. VoLTE call or ViLTE call) is ongoing in a first SIM card, the processor 113 may determine whether a packet switch (PS) paging or a circuit switch (CS) paging is received on a second SIM card. If a packet switch paging or a circuit switch paging is received on a second SIM card, the processor 113 will suspend the PS call which is ongoing on the first SIM card.

In an embodiment of the invention, when the processor 113 suspends the PS call which is ongoing on the first SIM card, the processor 113 will initiate a protection timer to avoid this PS call being suspended too long. The timing of the protection timer can be specified by the operator or the user, such as 2 seconds. When the timer expires, the processor 113 will resume this PS call on the first SIM card. Even though the call on the second SIM card still is not established completely when the timer expires, the processor 113 may still resume this PS call on the first SIM card and terminate the procedure for establishing the call on the second SIM card.

In an embodiment of the invention, the processor 113 may determine whether the PS or CS paging is for a call after suspending the PS call which is ongoing on the first SIM card. If the PS or CS paging is not for a call (e.g. the PS or CS paging is just for Short Messaging Service (SMS) message), the processor 113 will resume this PS call. If the PS or CS paging is for a call (e.g. a PS call or a CS call), the processor 113 may further determine whether to only display a message on a display device of the UE 110 to notify the user that there is the call.

In an embodiment of the invention, if the processor 113 determines to only display the message on the display device of the UE 110, the processor 113 will establish the call to obtain the caller number. Then, when the caller number is obtained, the processor 113 will disconnect the call. In addition, the processor 113 may obtain ID information from the address book according to the caller number. Then, the processor 113 may display the message on the display device, wherein the message comprises the caller number and the ID information. After the message is displayed on the display device, the processor 113 will resume the PS call which was ongoing on the first SIM card. That is to say, in this embodiment of the invention, the UE 110 only displays the message on the display device but the call may not be picked up. In another embodiment of the invention, the processor 113 may notify user by other means, such as vibration, flashlight, or voice notification. That is to say, the UE 110 also only notify user by one of these means, but the call may not be picked up.

In an embodiment of the invention, if the processor 113 determines not to only display the message on the display device of the UE 110, the processor 113 will establish the second call and report the call to the user directly (i.e. by displaying an incoming phone display on the display device). The processor 113 can determine to pick up, hold, or reject the call according to a selection by the user. Namely, in this embodiment of the invention, the user can decide whether to pick up, hold, or reject the call. If the user decides to pick up the second call, the processor 113 will terminate the protection timer and release the suspended PS call for the first SIM card.

In an embodiment of the invention, if the call is a second PS call based on the PS paging, the caller number is obtained from SIP INVITE message from a 4G network, and if the call is a CS call based on the CS paging, the caller number is obtained from CC SETUP message from a 2G/3G network. In an embodiment of the invention, the processor 113 may resume the suspended PS call by transmitting an RRCConnectionReestablishmentRequest message or a RRCConnectionRequest message or performing C-RNTI based random access procedure to the service network 120. The details are discussed below.

Figure 2:
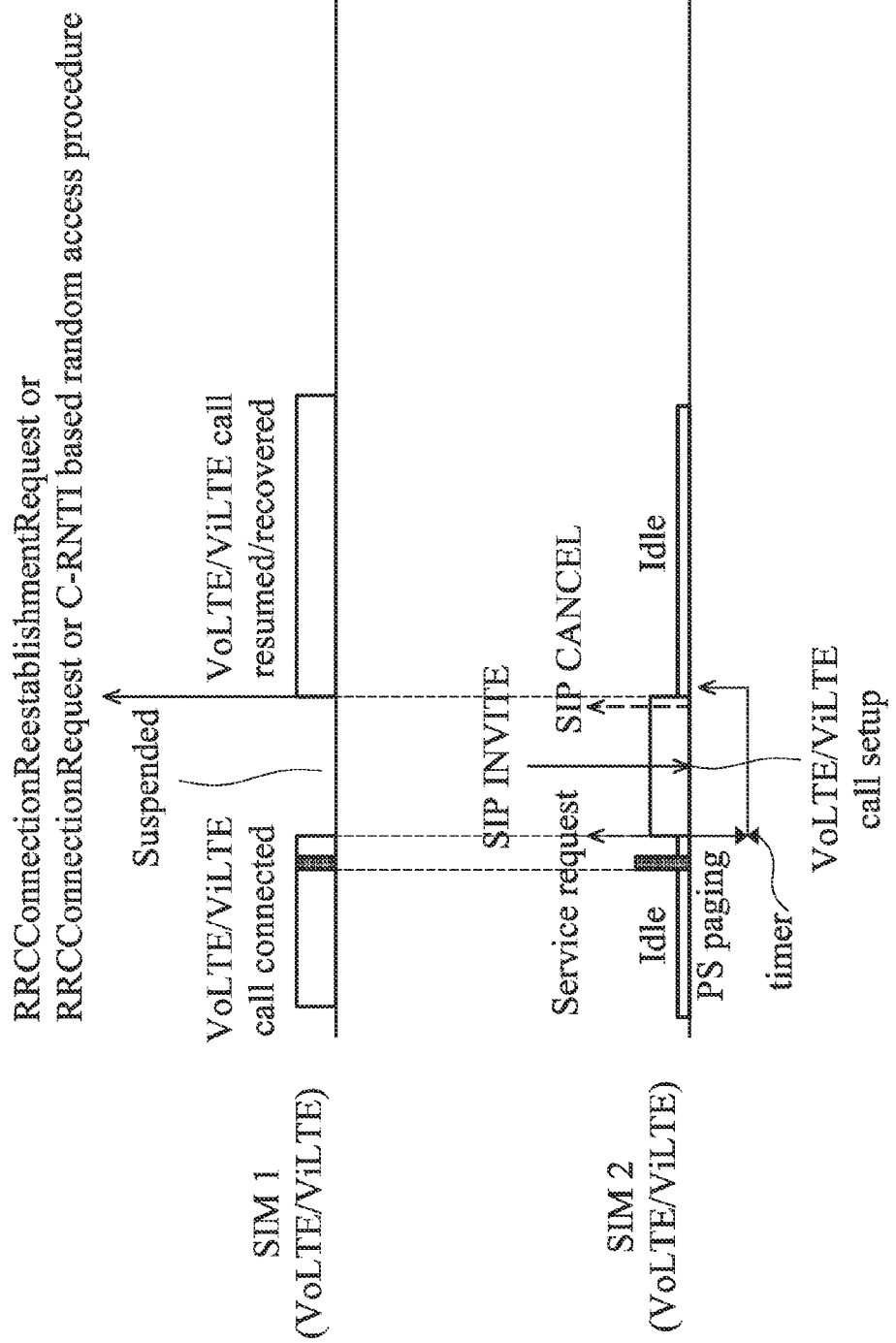
FIG. 2 is a schematic diagram illustrating how to obtain a caller number for a PS call according to an embodiment of the invention.

FIG. 2 is a schematic diagram illustrating how to obtain a caller number for a PS call (e.g. VoLTE call or ViLTE call) according to an embodiment of the invention. In FIG. 2, the first SIM card (i.e. SIM 1) is configured for CS and PS calls, and the second SIM card (i.e. SIM 2) is configured for CS and PS calls. When a PS call (regarded as first PS call) is ongoing on the SIM 1, the processor 113 may determine whether a PS paging or a CS paging from the network is listened to on the SIM 2. If another PS call (regarded as a second PS call) based on the PS paging is listened to on the SIM 2, the processor 113 may suspend the first PS call which is ongoing on the SIM 1 and initiate a protection timer to avoid the first PS call being suspended too long. Then, the UE 110 may establish the RRC connection with a second 4G network (e.g. E-UTRAN 150) on the SIM 2 to establish the second PS call. When the RRC connection is established, the UE 110 may transmit the Service Request message to the second 4G network to obtain the caller number corresponding to the second PS call. Then, the 4G network will transmit the SIP INVITE message to the UE 110. The SIP INVITE message may comprise the caller number or ID and therefore, the UE 110 can obtain the caller number according to the SIP INVITE message. When the UE 110 obtains the caller number or ID, the UE 110 may release the RRC connection with the second 4G network to disconnect the second PS call. In this embodiment of the invention, the UE 110 can transmit a SIP CANCEL message to the second 4G network to disconnect the second PS call. In addition, when the UE 110 obtains the caller number or ID of the second PS call, the UE 110 may display the message which comprises the caller number and ID information corresponding to the second PS call on the display device to notify the user. Then, when the message is displayed on the display device, the UE 110 may resume the suspended first PS call by transmitting an RRCConnectionReestablishmentRequest message or a RRCConnectionRequest message or performing C-RNTI based random access procedure to the first 4G network.

Figure 3:
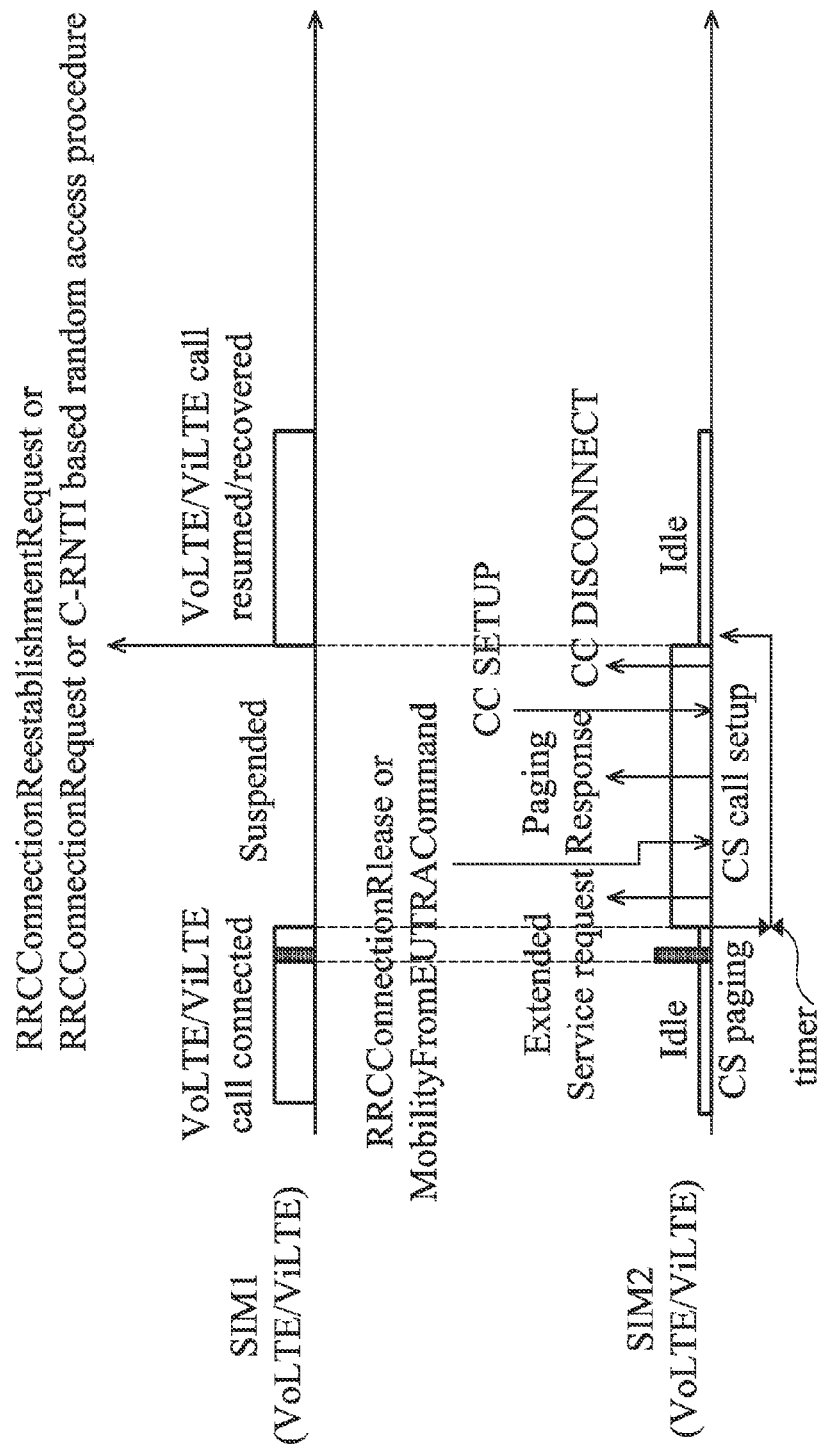
FIG. 3 is a schematic diagram illustrating how to obtain a caller number for a CS call according to an embodiment of the invention.

FIG. 3 is a schematic diagram illustrating how to obtain a caller number for a CS call from 2G/3G network according to an embodiment of the invention. In FIG. 3, the first SIM card (i.e. SIM 1) is configured for CS and PS calls (e.g. VoLTE call or ViLTE call) and the second SIM card (i.e. SIM 2) is configured for CS and PS calls. When a PS call is ongoing on the SIM 1, the processor 113 may determine whether a PS paging or a CS paging from the network is listened to on the SIM 2. If a CS call based on the CS paging is listened to on the SIM 2, the processor 113 may suspend the PS call which is ongoing on the SIM 1 and initiate a protection timer to avoid the PS call being suspended too long. Therefore, when the UE 110 needs to obtain the caller number of the CS call, the UE 110 may perform circuit switched fallback (CSFB) procedure first. In the CSFB procedure, the UE 110 may initiate the CSFB procedure by sending Extended Service Request message to the second 4G network. After the 4G network accepts the CSFB procedure, the 4G network may transmit a switching command (e.g. Mobility Form EUTRA Command message or RRC-ConnectionRlease message) to the UE 110 to indicate the UE 110 to fall back to the 2G network (GERAN 130) or 3G network (UTRAN 140) according to the switching command. When the CSFB procedure has been completed, the UE 110 may transmit the Paging Response message to the 2G network or 3G network. The 2G network or 3G network will transmit the CC SETUP message to provide the caller number of the CS call to the UE 110. When the UE 110 receives the CC SETUP message, the UE 110 will transmit the CC DISCONNECT message to disconnect the CS call. Then, the UE 110 may display the message which comprises the caller number and ID information corresponding to the CS call on the display device to notify the user. When the message is displayed on the display device, the UE 110 may resume the suspended PS call by transmitting an RRCConnectionReestablishmentRequest message or RRCConnectionRequest message or performing C-RNTI based random access procedure to the first 4G network. In an embodiment of the invention, when UE 110 transmits the CC DISCONNECT message to disconnect the CS call, the SIM 2 may back to 4G network to listen to the PS paging or CS paging.

Figure 4:
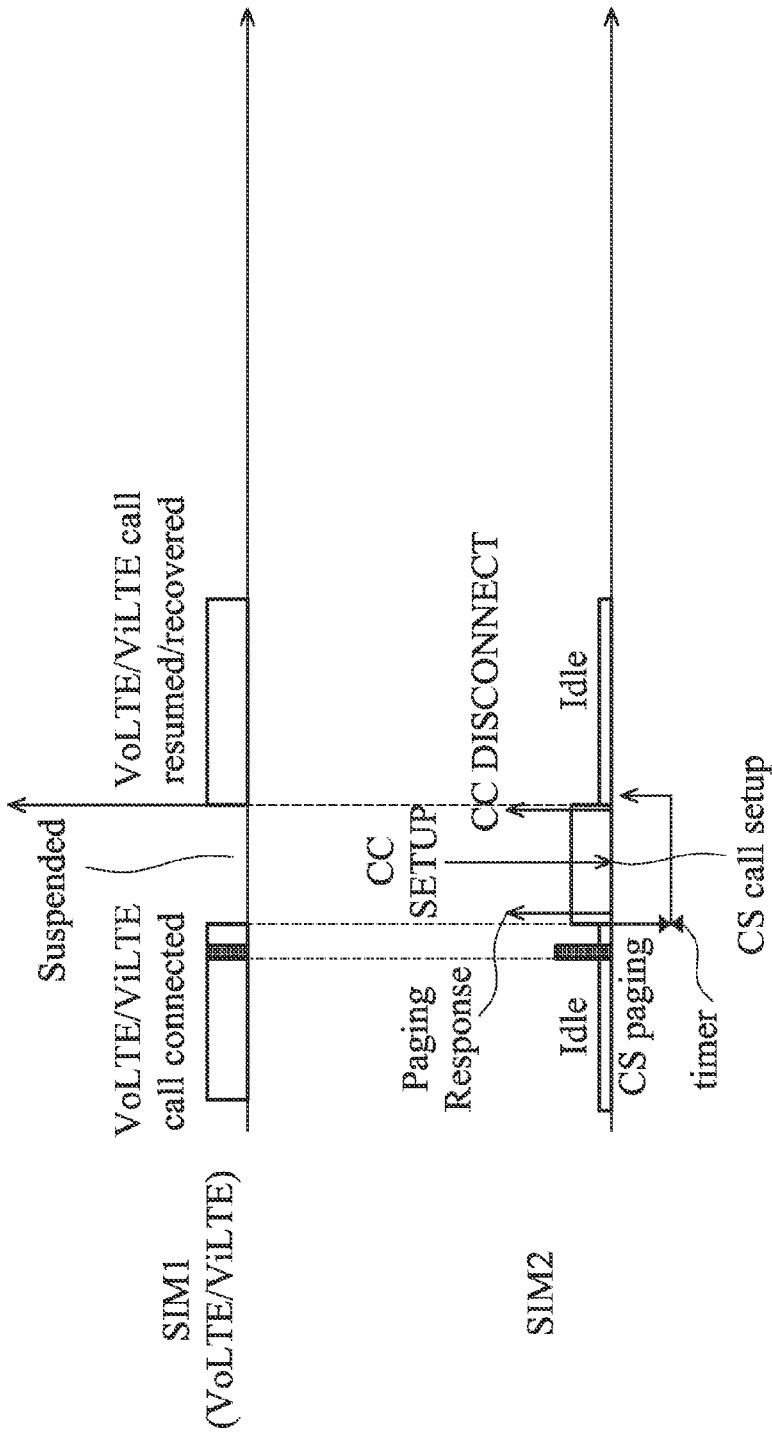
FIG. 4 is a schematic diagram illustrating how to obtain a caller number for a CS call according to another embodiment of the invention.

FIG. 4 is a schematic diagram illustrating how to obtain a caller number for a CS call from 2G/3G network according to another embodiment of the invention. In FIG. 4, the first SIM card (i.e. SIM 1) is configured for CS and PS calls (e.g. VoLTE call or ViLTE call) and the second SIM card (i.e. SIM 2) is only configured for CS calls. When a PS call is ongoing on the SIM 1, the processor 113 may determine whether a CS paging from the network is listened to on the SIM 2. If a CS call based on the CS paging is listened to on the SIM 2, the processor 113 may suspend the PS call which is ongoing on the SIM 1 and initiate a protection timer to avoid the PS call being suspended too long. Then, the UE 110 may transmit the Paging Response message to the 2G network (GERAN 130) or 3G network (UTRAN 140). The 2G network or 3G network will transmit the CC SETUP message to provide the caller number of the CS call to the UE 110. When the UE 110 receives the CC SETUP message, the UE 110 will transmit the CC DISCONNEVT to disconnect the CS call. Then, the UE 110 may display the message which comprises the caller number and ID information corresponding to the CS call on the display device to notify the user. When the message is displayed on the display device, the UE 110 may resume the suspended PS call by transmitting an RRCConnectionReestablishmentRequest message or RRCConnectionRequest message or performing C-RNTI based random access procedure to the 4G network.

In an embodiment of the invention, if the CA or DuCo is non-activated, the processor 133 may select the same 4G hardware as the first SIM card for the second SIM card to listen to the PS or CS paging. The details will be discussed in FIG. 5A-5C below.

FIGS. 5A-5C are schematic diagrams illustrating the 4G hardware configuration for non-activated CA or DuCo for DSDS technology according to an embodiment of the invention. As shown in FIG. 5A, one of the 4G hardware (i.e. RF resource RF1+4G base band circuit (4G BB)) is dedicated to the SIM 1 for the ongoing PS call. Because the CA or DuCo is non-activated, the processor 113 may dedicate the same 4G hardware to the SIM 2 to save power. That is to say, the SIM 2 can use this 4G hardware which has been dedicated to the SIM 1 to listen to the paging. When the SIM 2 receives a paging for another PS call, the PS call ongoing on the SIM 1 will be suspended and the other PS call will be established to obtain the caller number (FIG. 5B). When the caller number has been obtained, the PS call on the SIM 2 will be disconnected, and the message corresponding to the PS call will be displayed on the display device. Then, the suspended PS call will be resumed on the SIM 1, and the processor 113 will continue to determine whether a PS paging or a CS paging from the network is listened to on the SIM 2 (FIG. 5C).

In an embodiment of the invention, if the carrier aggregation (CA) or dual connectivity (DuCo) is activated, the processor 133 may dynamically select one of the active 4G hardware for the second SIM card to listen to the PS or CS paging. The details will be discussed in FIG. 6 below.

FIGS. 6A-6C are schematic diagrams illustrating the 4G hardware configuration for activated CA or DuCo for DSDS technology according to an embodiment of the invention. As shown in FIG. 6A, because the CA or DuCo is activated, all 4G hardware (e.g. two 4G hardware, RF resource RF1+4G BB and RF resource RFm+4G BB) can be dedicated to the SIM 1, i.e. the SIM 1 connects to the two 4G hardware at the same time to achieve better performance, e.g. data throughput. When a PS call is ongoing on the SIM 1, the processor 113 may dynamically dedicate one of the 4G hardware to the SIM 2. That is to say, the SIM 2 can use RF resource RF1+4G BB or RF resource RFm+4G BB to listen to the paging. When the SIM 2 receives a paging for another PS call, the PS call ongoing on the SIM 1 will be suspended and the other PS call will be established to obtain the caller number (FIG. 6B). When the caller number has been obtained, the PS call on the SIM 2 will be disconnected, and the message corresponding to the PS call will be displayed on the display device. Then, the suspended PS call will be resumed on the SIM 1 and the processor 113 will continue to determine whether a PS paging or a CS paging from the network is listened to on the SIM 2 (FIG. 6C).

In an embodiment of the invention, for dual SIM dual active (DSDA) technology, when a PS call (e.g. VoLTE call or ViLTE call) is ongoing in a first SIM card, the processor 113 may determine whether a paging is received on a second SIM card. If the paging is received on the second SIM card, the processor 113 may dedicate one of the communication hardware (2G/3G hardware or 4G hardware) to the second SIM card. Traditional DSDA technology needs to duplicate another 2G/3G hardware or 4G hardware to another SIM card. However, in the invention, the 2G/3G hardware or 4G hardware can be shared with the first SIM card and second SIM card. That is to say, the 2G/3G hardware or 4G hardware can be dynamically dedicated (switched) to the first SIM card and second SIM card by the processor 113 without suspending ongoing PS call on SIM1. In an embodiment of the invention, only the SIM card which connects to the 2G/3G hardware can perform Single Radio Voice Call Continuity (SRVCC) procedure to 2G/3G network.

In an embodiment of the invention, when the paging is received on a second SIM card, the processor 113 will determine whether the paging is PS paging or CS paging. If the paging is CS paging, the processor 113 will dedicate the 2G/3G hardware to the second SIM card and establish a CS call on the second SIM card. Because the UE 110 only has one 2G/3G hardware, the 2G/3G hardware only can be dedicated to one SIM card. Therefore, if the 2G/3G hardware is initially dedicated to the first SIM card, when the paging being listened to on the second SIM card is a CS paging, the processor 113 will switch the 2G/3G hardware from the first SIM card to the second SIM card.

If the paging is a PS paging, the processor 113 will determine whether the CA or DuCo is activated on the first SIM card. Because if the CA or DuCo is activated, the first SIM card may use all 4G hardware. If the first SIM card and the second SIM card use the same 4G hardware for respective PS calls, resource will conflict. Therefore, if the CA or DuCo is activated on the first SIM card, the processor 113 will deactivate the partial CA or DuCo on the first SIM card first (i.e. the first SIM card is not full CA or DuCo capable temporarily). When the processor 113 deactivates the partial CA or DuCo capability on the first SIM card, the processor 113 will dedicate an idle 4G hardware to the second SIM card and establish the PS call on the second SIM card. If the CA or DuCo is not activated on the first SIM card, the processor 113 will directly dedicate an idle 4G hardware to the second SIM card and establish the PS call on the second SIM card.

In an embodiment of the invention, the processor 113 further needs to consider the band combination (interference of bands) to avoid interference between two SIM cards which may result in drop call on both SIM cards. For example, only when the first SIM card and the second SIM card may be both in the high band, the processor 113 may use the DSDA technology.

FIGS. 7A-7B are schematic diagrams illustrating the 4G hardware configuration for non-activated CA or DuCo for DSDA technology according to an embodiment of the invention. As shown in FIG. 7A, one of the 4G hardware (RF resource RF1+4G BB) is dedicated to the SIM 1 for the ongoing PS call. Because the CA or DuCo is non-activated, the processor 113 may dedicate the same 4G hardware to the SIM 2 to save power. That is to say, the SIM 2 can use this 4G hardware which has been dedicated to the SIM 1 to listen to the paging. When the SIM 2 receives a paging for another PS call, the processor 113 will dedicate an idle 4G hardware (RF resource RFm+4G BB) to the SIM 2 and the PS call on the second SIM card (FIG. 7B).

FIGS. 8A-8B are schematic diagrams illustrating the 4G hardware configuration for activated CA or DuCo for DSDA technology according to an embodiment of the invention. As shown in FIG. 8A, because the CA or DuCo is activated on the SIM 1, all 4G hardware can be dedicated to the SIM 1. When a PS call is ongoing on the SIM 1 (use RF resource RF1+4G BB), the processor 113 may dynamically dedicate one of the 4G hardware to the SIM 2. That is to say, the SIM 2 can use the RF1+4G BB or RFm+4G BB to listen to the paging. When the SIM 2 receives a paging for another PS call, the processor 113 will deactivate the partial CA or DuCo on the SIM 1 first. When the processor 113 deactivates the CA or DuCo on the SIM 1, the processor 113 will dedicate an idle 4G hardware (RF resource RFm+4G BB) to the SIM 2 and establish the PS call on the SIM 2 (FIG. 8B).

FIGS. 9A-9B are schematic diagrams illustrating the 3G hardware configuration for DSDA technology according to an embodiment of the invention. As shown in FIG. 9A, if the CA or DuCo is non-activated, when a PS call is ongoing on the SIM 1 (use RF resource RF1+4G BB), the processor 113 may dedicate the same 4G hardware to the SIM 2 to listen to the paging to save power. When the SIM 2 receives a paging for a CS call, the processor 113 will dedicate the 2G/3G hardware (RF resource RFn+3G BB) to the SIM 2 and establish the CS call on the SIM 2 by the CSFB procedure (FIG. 9B). Note that, if the CA or DuCo is activated, in this embodiment, the CA or DuCo will be deactivated on the SIM 1 temporary, during the CSFB procedure and can be re-activated after the CS call is established on the 2G/3G network on the SIM 2. That is to say, SIM1 is still can maintain active CA or DuCo to use all 4G hardware, after the CS call is established on the 2G/3G network on the SIM 2.

Figure 10A:
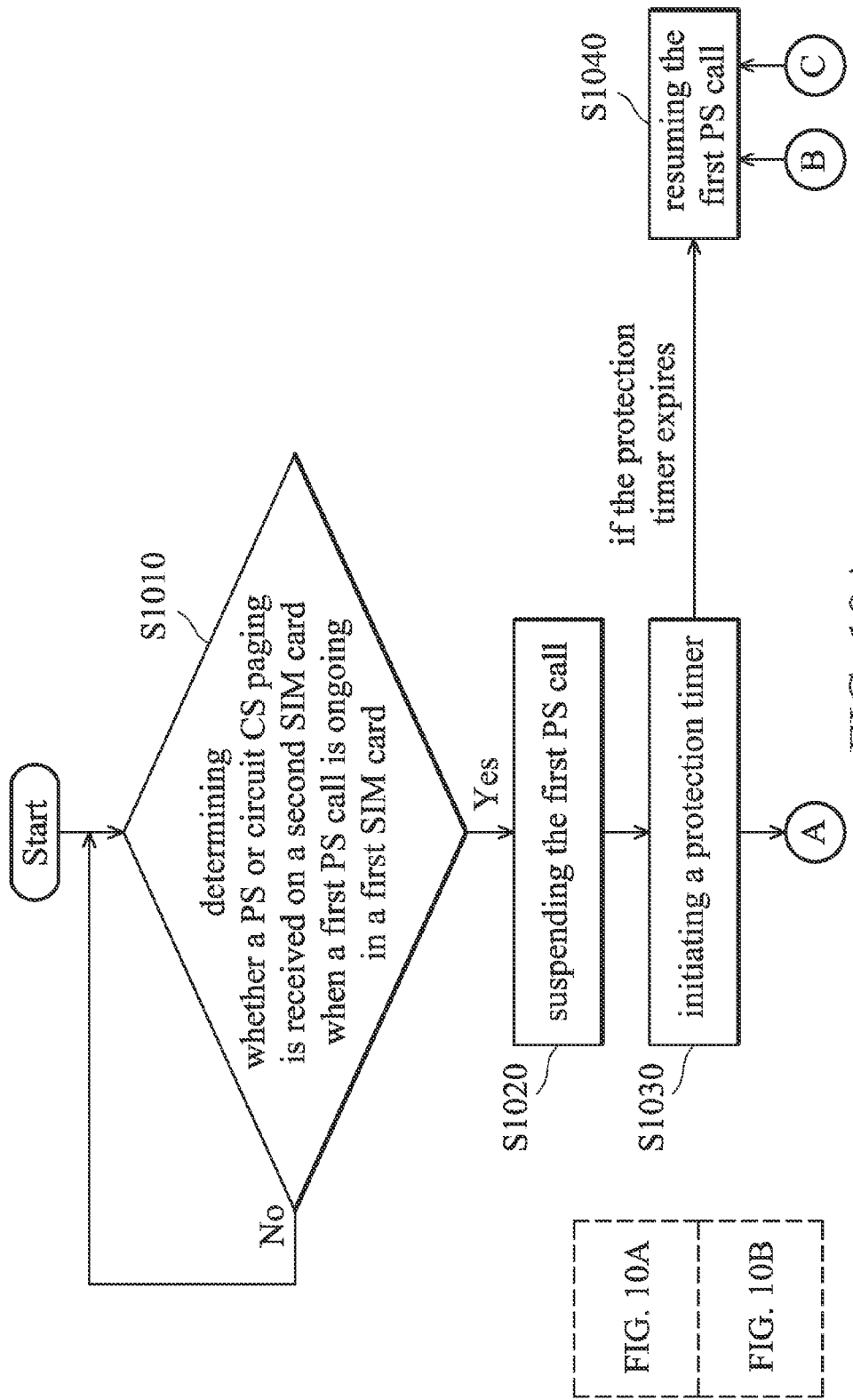
FIGS. 10A-10B is a flow chart illustrating the wireless communication method for dual SIM dual standby (DSDS) technology according to an embodiment of the invention.
Figure 10B:
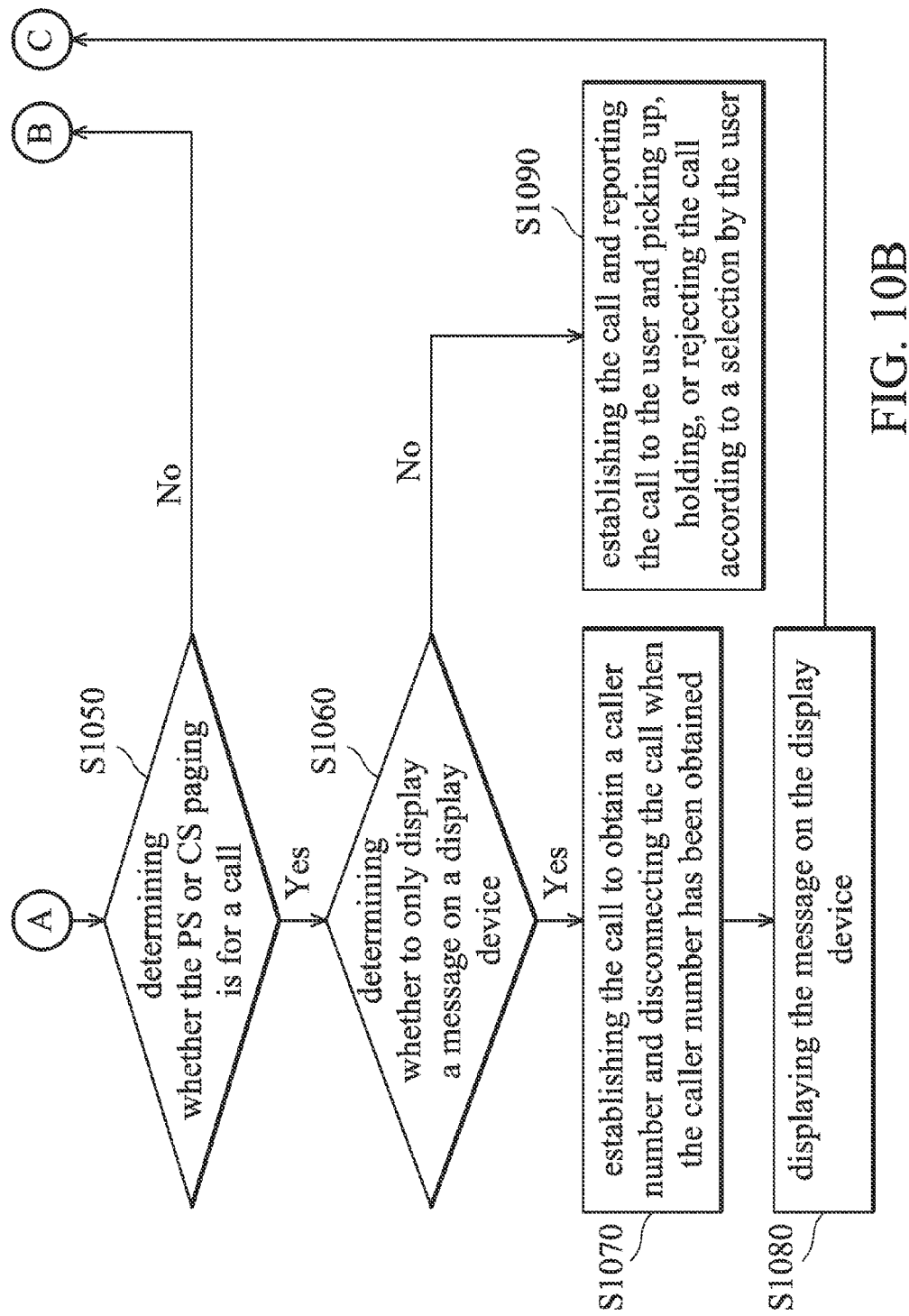

FIGS. 10A-10B is a flow chart illustrating the wireless communication method for dual SIM dual standby (DSDS) technology according to an embodiment of the invention. The wireless communication method is applied to the UE 110 which is capable of carrier aggregation (CA) or dual connectivity (DuCo). First, in step S1010, the UE 110 determines whether a packet switch (PS) or circuit switch (CS) paging is received on a second SIM card when a first PS call is ongoing in a first SIM card. If the PS or CS paging is received on the second SIM card, the step S1020 is performed. In step S1020, the UE 110 suspends the first PS call which is ongoing on the first SIM card. If the PS or CS paging is not received on the second SIM card, the method returns to step S1010.

In step S1030, the UE 110 initiates a protection timer to avoid the first PS call being suspended too long. When the protection timer expires, step 1040 will be performed. In step 1040, the UE 110 will resume the first PS call.

In step S1050, the UE 110 determines whether the PS or CS paging is for a call (MT PS call or MT CS call). If the PS or CS paging is not for a call, the method returns to step 1040. If the PS or CS paging is for a call, the step S1060 is performed. In step S1060, the UE 110 determines whether to only display a message on a display device of the UE 110 to notify the user that there is the call. If a determination is made to only display a message on the display device, step S1070 is performed. In step S1070, the UE 110 may establish the call to obtain a caller number and disconnect the call when the caller number has been obtained by the UE 110. In step S1080, the UE 110 displays the message on the display device, wherein the message comprises the caller number and ID information, and then the method returns to step S1040. If a determination is made to not display a message on the display device, step S1090 is performed. In step 1090, the UE 110 establishes the call and reports the call to the user and the UE 110 picks up, holds, or rejects the call according to a selection by the user. In an embodiment of the invention, if the call is picked up, the UE 110 may terminate the protection timer and release the first PS call. In another embodiment of the invention, the UE 110 may notify user by other means, such as vibration, flashlight, or voice notification. That is to say, the UE 110 also only notify user by one of these means, but the call may not be picked up.

In an embodiment of the invention, if the MT call is a second PS call based on the PS paging, the caller number is obtained from SIP INVITE message from a 4G network, and if the MT call is a CS call based on the CS paging, the caller number is obtained from CC SETUP message from a 2G/3G network. In an embodiment of the invention, in step S1040, the first PS call is resumed via transmitting an RRCConnectionRestablishmentRequest message or an RRCConnectionRequest message or performing C-RNTI based random access procedure.

In an embodiment of the invention, the method further comprises that if the CA or DuCo is activated, the UE 110 may dynamically select one of the active 4G hardware of the Multi-SIM user equipment for the second SIM card to listen to the PS or CS paging. In another embodiment of the invention, the method further comprises the condition wherein the UE 110 may select the same 4G hardware of the Multi-SIM user equipment as the first SIM card for the second SIM card to listen to the PS or CS paging, if the CA or DuCo is non-activated. In another embodiment of the invention, SIM 2 can always listen to the paging through the secondary hardware which is dedicated to communicate with secondary component carrier or secondary eNB to avoid the interruption of reception or transmission such as missing the control signaling (e.g. RRC messages or NAS messages) from network.

Figure 11B:
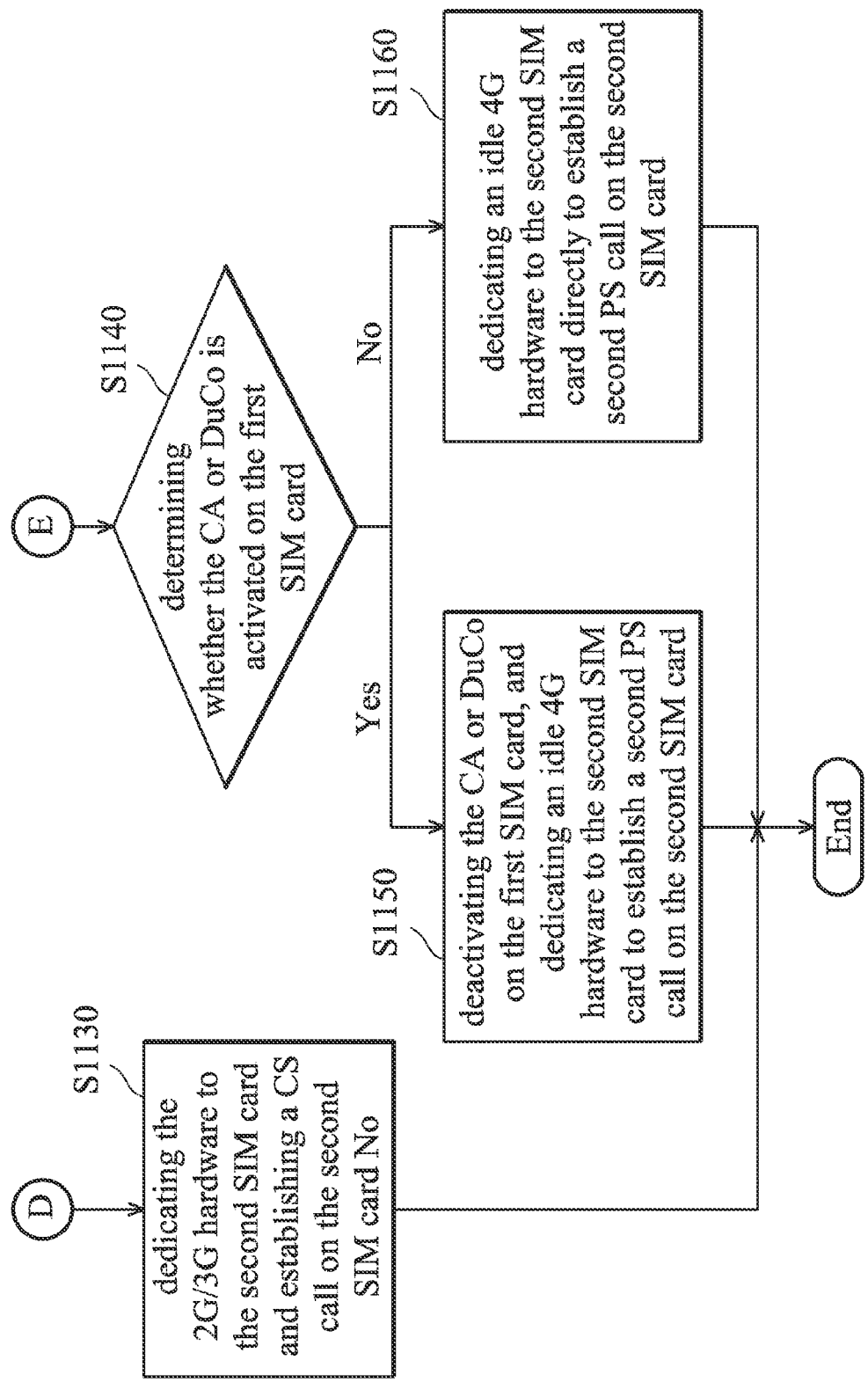

FIGS. 11A-11B is a flow chart illustrating the wireless communication method for dual SIM dual active (DSDA) technology according to an embodiment of the invention. The wireless communication method is applied to the UE 110 which is capable of carrier aggregation (CA) or dual connectivity (DuCo). First, in step S1110, the UE 110 determines whether a paging is received on a second SIM card when a first PS call is ongoing in a first SIM card. If the paging is received on the second SIM card, step S1120 is performed. In step, S1120, the UE 110 determines whether the paging is a CS paging. If the paging is not received on the second SIM card, the method returns to step S1110.

If the paging is a CS paging, step S1130 is performed. In step S1130, the UE 110 dedicates (or switches) the 2G/3G hardware to the second SIM card and establishes a CS call on the second SIM card. Note that, if the CA or DuCo is activated, the CA or DuCo will be deactivated on the SIM 1 temporary, during the CSFB procedure and can be re-activated after the CS call is established on the 2G/3G network on the SIM 2. If the paging is not a CS paging (i.e. the paging is a PS raging), step S1140 is performed. In step S1140, the UE 110 determines whether the CA or DuCo is activated on the first SIM card. If the CA or DuCo is activated on the first SIM card, step S1150 is performed. In step S1150, the UE 110 deactivates the CA or DuCo on the first SIM card, and dedicates an idle 4G hardware to the second SIM card to establish a second PS call on the second SIM card. If the CA or DuCo is not activated on the first SIM card, step S1160 is performed. In step S1160, the UE 110 dedicates an idle 4G hardware to the second SIM card directly to establish a second PS call on the second SIM card.

In the wireless communication method of the invention, the DSDS device if a PS call is ongoing on one of the SIM card, when another PS call or a CS call is received on the other SIM card, the DSDS device can suspend the first PS call temporarily and initiate a protection timer to avoid the first PS call being suspended too long. Therefore, the user can flexibly choice to only display the call information corresponding to the PS call or CS call received on the other SIM card on the device, or can decide whether to pick up the PS call or CS call. In addition, in the wireless communication method of the invention, the DSDA device does not need to duplicate additional 4G hardware to another SIM card for activating the dual voice call. The DSDA device can dynamically switch the 4G hardware to another SIM card.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a storing, displaying and/or outputting step as required for a particular application. In other words, any data, records, fields, and/or intermediate results discussed in the methods can be stored, displayed, and/or output to another device as required by a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communication method for dual SIM dual standby (DSDS) technology, which is applied on Multi-SIM user equipment (UE) which is capable of carrier aggregation (CA) or dual connectivity (DuCo), the wireless communication method comprising:
   determining whether a packet switch (PS) or circuit switch (CS) paging is received on a second SIM card when a first PS call is ongoing in a first SIM card;
   suspending the first PS call which is ongoing on the first SIM card if the packet switch (PS) or circuit switch (CS) paging is received on the second SIM card; and
   initiating a protection timer when the first PS call is suspended; and
   resuming the first PS call when the protection timer expires.

2. The wireless communication method of claim 1, further comprising:
   determining whether the PS or CS paging is for a Mobile Terminated (MT) call after suspending the first PS call which is ongoing on the first SIM card; and
   resuming the first PS call if the PS or CS paging is not for the call.

3. The wireless communication method of claim 2, further comprising:
   determining whether to only notify a user that there is the MT call if the PS or CS paging is for the MT call.

4. The wireless communication method of claim 3, further comprising:
   establishing the call to obtain a caller number, if a determination is made to only notify the user that there is the MT call;
   disconnecting the call when obtaining the caller number;
   notify the user that there is the MT call; and
   resuming the first PS call after notifying the user that there is the MT call.

5. The wireless communication method of claim 3, further comprising:
   establishing the call and reporting the call to the user directly, if a determination is made not to notify the user that there is the MT call;
   picking up, holding or rejecting the call according to a selection result of the user;
   terminating the protection timer when the call is picked up; and
   disconnecting the first PS call.

6. A Multi-SIM user equipment (UE) which is capable of carrier aggregation (CA) or dual connectivity (DuCo), for dual SIM dual standby (DSDS) technology, the Multi-SIM user equipment comprising:
   a processor, configured to determine whether a packet switch (PS) or circuit switch (CS) paging is received on a second SIM card when a first PS call is ongoing in a first SIM card, and suspend the first PS call which is ongoing on the first SIM card if the packet switch (PS) or circuit switch (CS) paging is received on the second SIM card, wherein the processor further initiates a protection timer when the first PS call is suspended and resumes the first PS call when the protection timer expires.

7. The Multi-SIM user equipment of claim 6, wherein the processor further determines whether the PS or CS paging is for a call after suspending the first PS call which is ongoing on the first SIM card, and wherein the processor further resumes the first PS call if the PS or CS paging is not for the call.

8. The Multi-SIM user equipment of claim 7, wherein the processor further determines whether to only notify a user that there is the MT call if the PS or CS paging is for the call.

9. The Multi-SIM user equipment of claim 8, wherein the processor further establishes the call to obtain the caller number, if the processor determines to only notify the user that there is the MT call, and wherein the processor disconnects the call when obtaining the caller number, and notify the user that there is the MT call, and wherein the processor further resumes the first PS call after notifying the user that there is the MT call.

10. The Multi-SIM user equipment of claim 8, wherein the processor further establishes the call and reports the call to the user directly, if the processor determines not to notify the user that there is the MT call, and the processor picks up, holds, or rejects the call according to a selection result of the user, and wherein the processor further terminates the protection timer when the call is picked up, and disconnect the first PS call.

* * * * *